W. G. SNOW.
BOX NAILING PRESS.
APPLICATION FILED OCT. 1, 1913.

1,102,992.

Patented July 7, 1914.
3 SHEETS—SHEET 1.

WITNESSES:

INVENTOR
W. G. Snow.
BY
ATTORNEY

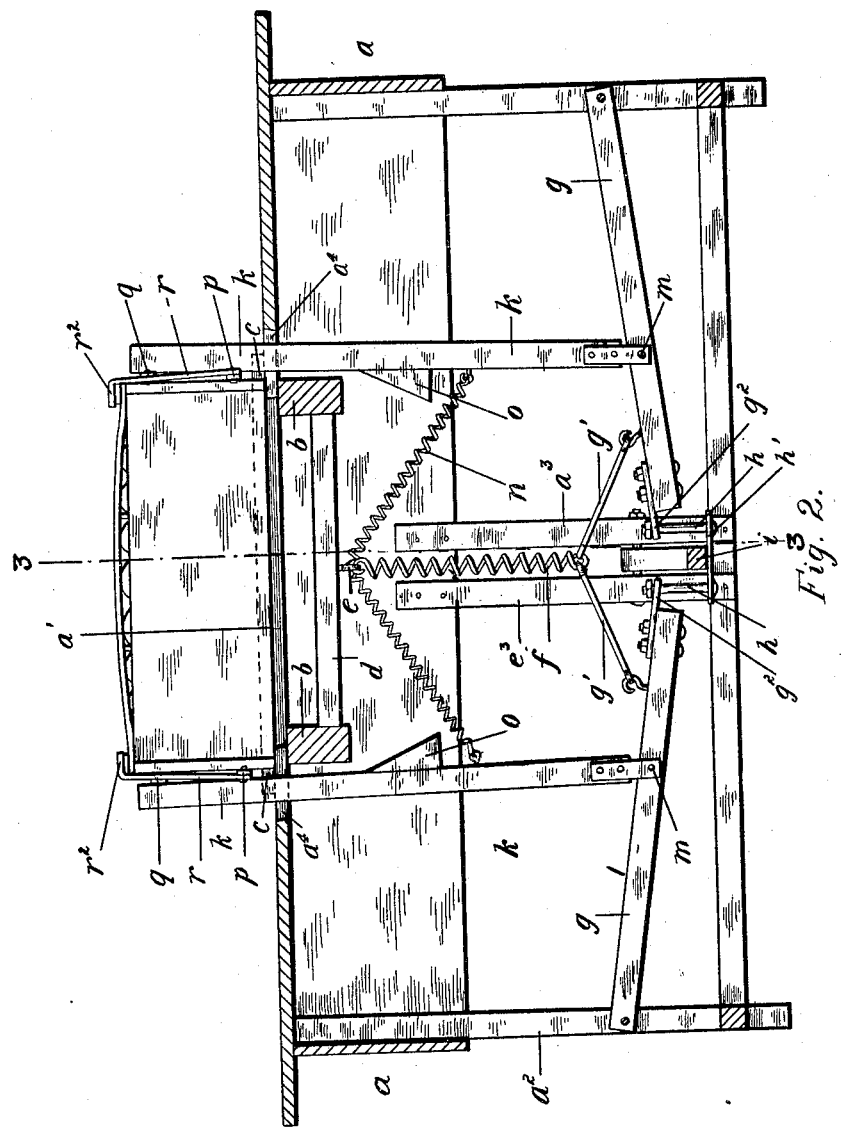

W. G. SNOW.
BOX NAILING PRESS.
APPLICATION FILED OCT. 1, 1913.

1,102,992.

Patented July 7, 1914.
3 SHEETS—SHEET 3.

WITNESSES:

INVENTOR
W. G. Snow.
BY
ATTORNEY

UNITED STATES PATENT OFFICE.

WILLIS G. SNOW, OF HOOD RIVER, OREGON.

BOX-NAILING PRESS.

1,102,992.  Specification of Letters Patent.  Patented July 7, 1914.

Application filed October 1, 1913. Serial No. 792,910.

*To all whom it may concern:*

Be it known that I, WILLIS G. SNOW, a citizen of the United States, and a resident of Hood River, Hood River county, State of Oregon, have invented a new and useful Improvement in Box-Nailing Presses, of which the following is a specification.

My invention relates to means facilitating the fastening of the cover or top of that type of fruit boxes which are provided with transverse bars on top, over which the cover is bent when fastened in place, so that the fruit will be protected from crushing and also be properly ventilated; and my invention particularly relates to the machines used for bending the box top over said transverse bars for holding its ends down while being nailed on the body of the box.

The object of my invention is to provide a machine which will do the work mentioned quickly and will automatically release the box when the nailing process has been completed and the operating parts of the machine are released.

Another feature of my invention lies in the use of grappling devices for holding the box-top ends which will automatically adjust themselves, while being operated, so as to exert a uniform pressure on the ends of the box-top notwithstanding one or both of such ends are inclined from the horizontal. Without such automatic adjustment the grappling devices would be apt to exert an uneven pull and possibly break the cover, or imperfectly hold one or both ends of the box-top on the body of the box.

The above mentioned and other incidental features are all hereinafter fully set forth.

Figure 1:
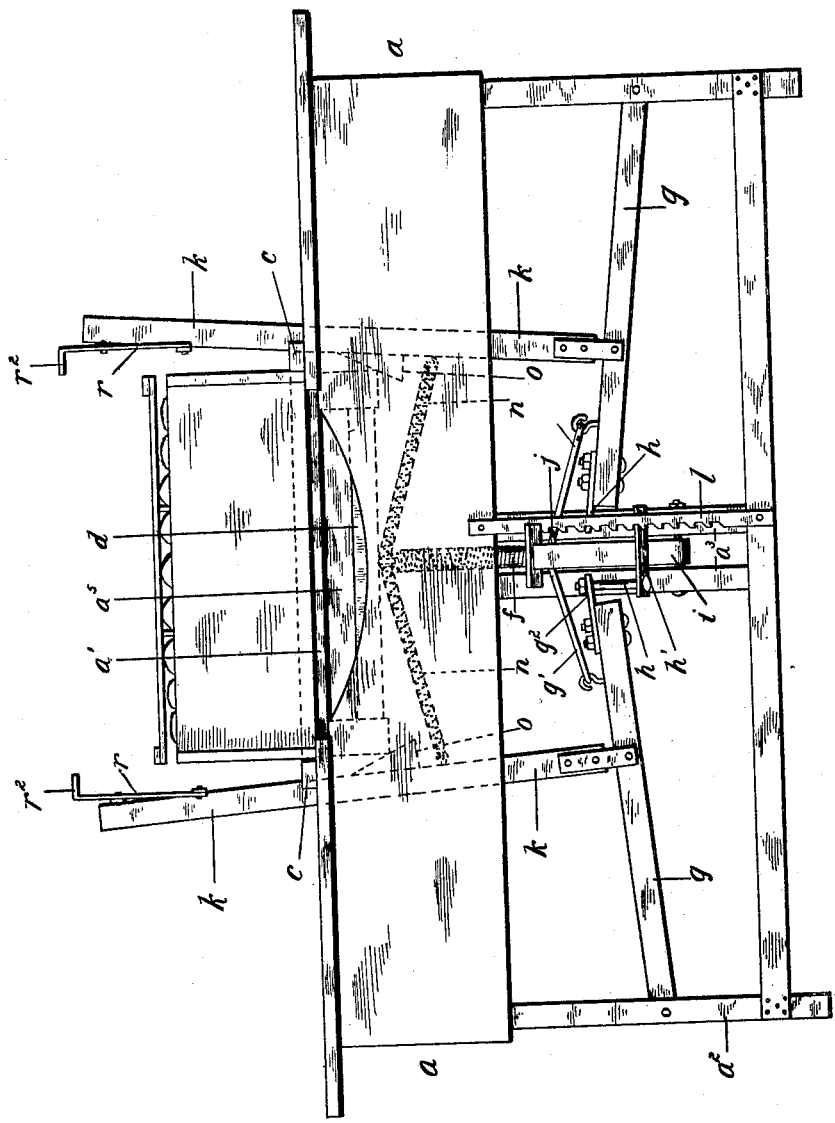
Figure 4:
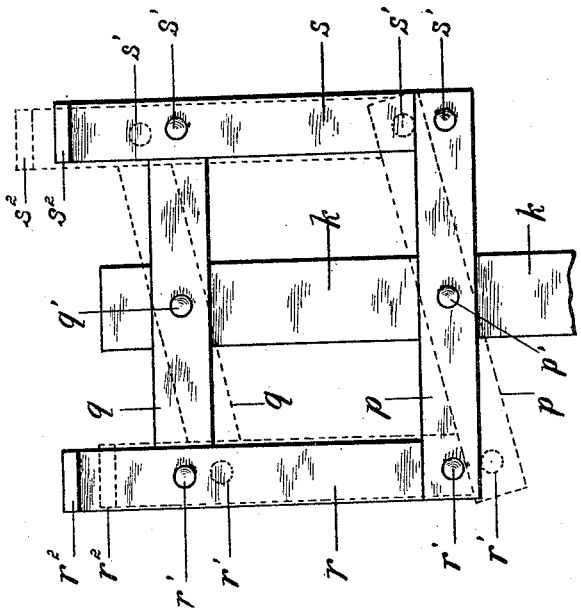
Figure 3:
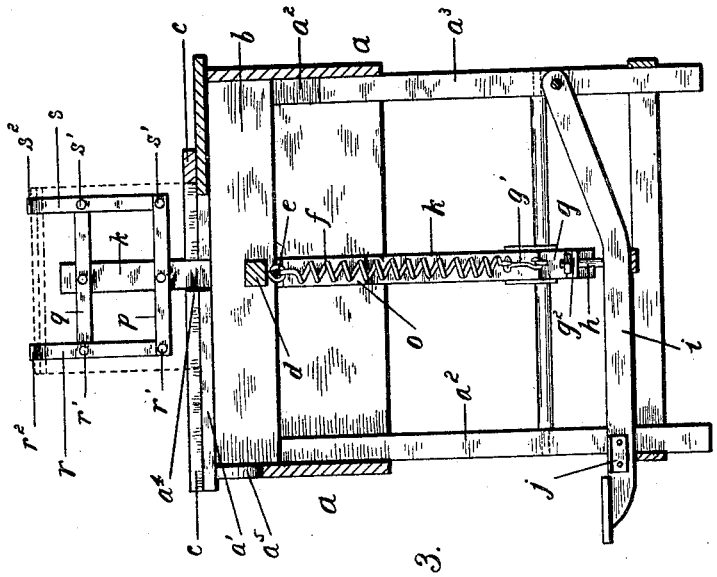

In the accompanying drawings: Figure 1 shows a front elevation of my press with the operating parts in their inactive positions. A fruit box, ready to be nailed up, is shown in place on the press table; Fig. 2 is a longitudinal vertical section of the press; this view illustrates the further action of the operating parts when the machine is operated to press the cover of the box down and hold it in such position while being nailed; Fig. 3 is a transverse vertical section taken approximately on the line 3—3 of Fig. 2, the fruit box being shown in broken outlines; and Fig. 4 is a larger-sized detail of the automatically adjustable holder fingers; the broken lines of this figure show these fingers moved to another position.

My press machine comprises a table, $a$, the top of which is cut away as shown at $a'$. This cut-away portion is of a length slightly greater than that of the smaller sized fruit box to be handled by my machine. Cross-bars $b$ located under the cut-away portion $a'$ form a support for the fruit box. Said cross-bars, $b$, are connected by a longitudinal member $d$. Cleats, $c$, on the table top serve as a seat for guiding and holding a fruit box of larger size.

On the member $d$ is fastened a ring $e$, from which depends a coil-spring $f$. Pivotally mounted between the end legs $a^2$ of the table, $a$, are the treadle bars $g$. The lower end of the coil-spring $f$ is connected to said treadle bars by links $g'$, tending to hold the latter in the position shown in Fig. 1.

On the treadle bars are fastened projection plates $g^2$, the ends of which support pendent pins $h$, and the latter support a horizontal plate $h'$. A foot treadle $i$ is pivotally mounted between the vertical struts $a^3$ at the rear of the table. Said foot treadle bears on the horizontal plate $h'$ and when it is depressed the treadle bars $g$ will likewise be depressed against the tension of the spring $f$.

The treadle is provided with a plate $j$, adapted to be engaged with the teeth of a ratchet bar $l$, located at the front of the table, to hold the treadle down. When the foot treadle $i$ is released from the ratchet the parts will be restored to their normal position by the action of the coil-spring $f$.

In the top of the table, $a$, are provided longitudinal slots $a^4$, to accommodate the movement of the grapple arms $k$, which extend through such slots. The lower ends of the grapple arms $k$ are pivotally connected to the treadle $g$ by the pins $m$. A tension coil-spring $n$ is inserted through the ring $e$ and is connected to the two arms $k$ for normally holding said arms inward.

On the upper ends of the grapple arms $k$ are pivoted the cross-arms $p$, $q$, by pins $p'$, $q'$ respectively. See Fig. 4. Said arms are connected by the parallel upright members $r$ and $s$, the upper ends of which are made with hands $r^2$, $s^2$, adapted to grip the ends of the box cover. The parallel members $r$ and $s$ are fastened on the cross arms $p$, $q$ by pins $r'$, $s'$, respectively, whereby said members are adapted for parallel movement. Thus when an end of the box cover is not in horizontal plane the members $r$ and $s$ will adjust themselves to the inclination and permit the hands to bear down on the box cover with a uniform pressure notwithstanding.

On the inner faces of the arms $k$ are fastened the wedge shaped cams $o$. When the box cover has been nailed down and the foot treadle $i$ is released, the arms $k$ will be raised by the drawing up of the treadle bars $g$, and the parts are so relatively arranged that during such upward movement of the arms $k$ the cams $o$ will contact with the cross bars, $b$, and in so doing cause said grapple arms $k$ to be moved outward and thereby releasing the latter from the fruit box. See Fig. 1.

The front of the table, $a$, is cut away as shown at $a^5$ (see Figs. 1 and 3) so that the operator may thrust his arm underneath the box in removing the latter from the table.

I claim:

1. In a box press, the combination of reciprocable grappling arms also adapted for being moved laterally; manually operated means for operating said arms; means for placing and holding the grappling arms in working position while being operated; and cam actuated means for moving said arms out of working position while making their return movement.

2. In a box press, the combination of reciprocable grappling arms also adapted for being moved laterally; a treadle and connections for operating said arms; means for placing and holding the grappling arms in working position while being operated; and cam actuated means for moving said arms out of working position while making their return movement.

3. In a box press, the combination of reciprocable grappling arms also adapted for being moved laterally; a treadle and connections for operating said arms; a spring element for placing and holding the grappling arms in working position while being operated; and cam actuated means for moving said arms out of working position while making their return movement.

4. In a box press, the combination of reciprocable grappling arms; grappling hands fastened on the extremities of the grappling arms; said hands comprising two members spaced apart; and means pivotally connecting said members to the grappling arms, said means permitting said members to have independent movement in a line parallel to said arms.

5. In a box press, the combination of reciprocable grappling arms; grappling hands fastened on the extremities of the grappling arms; said hands comprising two members located on either side of said arms; and means pivotally connecting said members to the grappling arms, said means permitting said members to have independent movement in a line parallel to said arms.

6. In a box press, the combination of reciprocable grappling arms; grappling hands fastened on the extremities of the grappling arms; said hands comprising two members spaced apart; and means connecting said members with the grappling arms and permitting said members to adjust themselves to an inclined surface.

7. In a box press, the combination of reciprocable grappling arms also adapted for being moved laterally, means for placing and holding the grappling arms in working position while being operated; and cams on the inner faces of said grappling arms, abutting surfaces for said cams, whereby said grappling arms are spread apart while being returned to their inactive position.

8. In a box press, the combination of reciprocable grappling arms also adapted for being moved laterally, means for placing and holding the grappling arms in working position while being operated; cams on the inner faces of said grappling arms, abutting surfaces for said cams, whereby said grappling arms are spread apart while being returned to their inactive position; grappling hands fastened on the extremities of the grappling arms; said hands comprising two members spaced apart; and means connecting said members with the grappling arms and permitting said members to adjust themselves to an inclined surface.

9. In a box press, the combination of reciprocable grappling arms also laterally movable; treadle mechanism, for operating the same, consisting of a central treadle bar, laterally extending members connecting such bar with said grappling arms; a spring element controlling the treadle bar; another spring element having lateral extensions connecting the reciprocable grappling arms and having a tendency to move the same inward normally; and cams on the inner faces of said grappling arms, abutting surfaces for said cams; whereby said grappling arms are spread apart while being returned to their inactive position.

10. In a box press, the combination of reciprocable grappling arms also laterally movable; treadle mechanism, for operating the same, consisting of a central treadle bar, laterally extending members connecting such bar with said grappling arms; a spring element controlling the treadle bar; another spring element having lateral extensions connecting the reciprocable grappling arms and having a tendency to move the same inward normally; cams on the inner faces of said grappling arms, abutting surfaces for said cams, whereby said grappling arms are spread apart while being returned to their inactive position; grappling hands fastened on the extremities of the grappling arms; said hands comprising two members spaced apart; and means connecting said members with the grappling arms and permitting said members to adjust themselves to an inclined surface.

WILLIS G. SNOW.

Witnesses:
PETE SHIVELY,
J. M. CULBERTSON.